United States Patent [19]

Chapin, Jr. et al.

[11] Patent Number: 4,485,398

[45] Date of Patent: Nov. 27, 1984

[54] UNDERWATER CAMERA

[75] Inventors: Herbert D. Chapin, Jr., Fullerton, Calif.; Pierre J. Bonnescuelle de Lespinois, Port Washington, N.Y.; Alan H. Young, Plantation; John Shelly, Greenacre City, both of Fla.

[73] Assignee: Aquavision International Ltd., New York, N.Y.

[21] Appl. No.: 325,406

[22] Filed: Nov. 27, 1981

[51] Int. Cl.³ .............................................. H04N 9/09
[52] U.S. Cl. ........................................ 358/50; 358/99
[58] Field of Search ..................................... 358/50, 99

[56] References Cited
FOREIGN PATENT DOCUMENTS
2909895 9/1980 Fed. Rep. of Germany ........ 358/99

OTHER PUBLICATIONS

"A Remote-Controlled Underwater TV Camera", NHK Laboratory Note, pp. 1 & 3-12 by Kasama et al., Nov. 1979.

Primary Examiner—Richard Murray
Attorney, Agent, or Firm—H. Ross Workman; Rick D. Nydegger; Allen R. Jensen

[57] ABSTRACT

An underwater color television camera system for use in high pressure or dense shielding applications. The system includes a spread tube color television camera encased in a three-segment housing designed to provide quick access to and interchangeability of camera parts, while also providing protection to the camera from water pressure at depths of over 2500 feet below water surface. A television viewfinder is affixed to the camera housing for use during manual operation by divers. A control center which includes computer devices is remotely connected by coaxial or triaxial cable to the camera so as to permit surface control and monitoring of numerous camera operations. Camera operations and applications are capable of enhancement by use of computer generated graphics, computer navigation assistance, and computer aided visual communication with divers.

25 Claims, 6 Drawing Figures

UNDERWATER CAMERA

FIELD OF THE INVENTION

The present invention relates to underwater cameras and more particularly to underwater color television cameras for use in high pressure or dense shielding applications.

BACKGROUND OF THE INVENTION

Underwater cameras are well-known and have been used for many years in both scientific, recreational, and commercial underwater exploration. During more recent times, the use of underwater television cameras has become an increasingly important and desirable tool in underwater exploration.

In attempting to locate underwater objects, or to study underwater geography, it is often necessary to explore large geographic areas. By utilizing television cameras, observers in a surface vessel may visually examine the underwater surroundings as seen by the camera without waiting for the bringing back of the camera by the diver and for the developing of the film. Further, the use of television cameras in underwater applications permits remote control camera operation. Remote operation of the camera is very desirable since the underwater applications are not then limited by a diver's air supply or by the physical capabilities of underwater divers in controlling the camera.

The use of color television in underwater exploration is particularly desirable since the identification of colors increases the ability to detect contrasts and to better identify and understand the physical makeup of the object being viewed.

With the more recent advent of deep-water oil exploration and drilling, as well as other high-pressure (also often referred to as "dense shielding") underwater activities, the use of remotely controlled television cameras has become increasingly important. In fact, underwater television cameras comprise a very necessary part of the conducting of thorough and reliable deep-water exploration.

It is well-known that water pressure increases rapidly with depth, and thus unprotected divers cannot operate at depths greater than several hundred feet below the water surface. However, deep-water exploration and similar activities may require examination of subjects at depths in excess of 2,500 feet below the water surface. It is impossible to provide manual operation of television cameras by divers at such depths. Thus, used in conjunction with specialized underwater vehicles, remotely operated underwater television cameras thus provide the only practical means by which the subjects of deep-water exploration may be visually inspected.

Due to the effects of water pressure, even at depths of only a few hundred feet, the sizes and shapes of camera housings available for underwater use have been very restricted in the past. As a necessary result, the possible configurations of the television cameras used in underwater applications have been restricted by the design limitations of the housing. This restriction has been particularly limiting on the ability to use those types of color television cameras and associated equipment which provide the highest quality picture and color resolution. This is a very undesirable limitation due to the fact that an important feature of exploration in deep and often cloudy water is the ability to clearly view the configuration and color composition of structures present in the area of exploration. Accordingly, this limitation has comprised a major handicap in the ability to conduct efficient and thorough deep-water exploration.

Because of the above factors, up to the present time, the types of color television cameras which could be used in underwater applications were restricted to stacked tube camera embodiments. In these camera embodiments, the three color tubes (red, blue, and green) are configured in axial alignment with the camera body, in a "stacked" relationship. In creating this relationship, several prisms are required for separating the colors in the light received through the lens and for directing each separated color to its respective axially aligned color tube.

The use of multiple prisms inherently causes a reduction in the picture quality and resolution produced by the camera. Nevertheless, this camera design has necessarily been utilized since its configuration can be utilized in the only canister housing design available which could stand the high water pressures experienced in deep-water photography.

In addition to the necessary use of the stacked tube camera, prior art underwater color television camera systems have also been restricted by the housing size to use of a lens which is of a diameter not exceeding that of the camera body. Such lenses generally provide poor picture clarity and virtually always have focal lengths which require either remote or manual focusing in order to shift between subjects which are near the camera and those which are far away. The necessity for a diver or remote operator to be continually adjusting the camera focus is a great impediment to the ability to quickly obtain acceptable pictures of moving subjects or changing terrain.

In addition to problems in camera use as described above, camera maintenance and repair in prior art systems has been a continuing problem. In using the stacked tube camera, if a malfunction occurred, or if other service was required, the entire camera was necessarily removed from its housing or canister in order to make the required repairs. This disabled the full camera system until the repair, no matter how insignificant, had been completed.

A color television camera which has been heretofore used in the television broadcasting industry (and which would be very desirable for use in underwater environments) utilizes three separate color tubes, two of which are directed outward from the camera body. This "spread tube" arrangement in the television camera (sometimes referred to as a "three-tube camera") requires only a single prism for separating the colors and directing them to the proper tubes. Since incoming light passes through only a single prism, very good resolution of color is possible, and when this camera is coupled with a high quality lens, it produces a picture far superior to that from the stacked tube camera. Nevertheless, until the present time it has been impractical to utilize such a camera for essentially any underwater purpose because the canisters required to house the camera could not be adapted to operation at anything but near surface depths.

Prior to the present invention, the general feeling has been that a spread tube color television camera was not adaptable for use in underwater exploration since its irregular surface configuration would complicate maintenance problems even further. For example, use of a spread tube camera would require a very large canister in order to surround the tubes and camera. Although such a large cylindrically shaped canister could accomodate the spread tubes, significant structural support within the canister would be required to prevent the remainder of the camera from wobbling in an unstable and thus unusable fashion. The structure required for supporting and stabilizing the spread tube camera in such a housing would cause a problem with access to the camera for maintenance and repair. In addition, a cylindrical housing of a size which would accomodate such a camera would be very bulky and awkward for a diver to handle. Such a housing would necessarily be heavy in construction or would require numerous weight belts or like devices to displace the amount of water necessary for the weight of the camera system to be "neutral" in the underwater environment.

Alternatively, a canister which somewhat conforms to the camera structure could be used with no stability problems. However, the latter design would not permit removal of the camera from the canister housing for servicing and therefore, such a design would be clearly unworkable. Thus, until the present time, the use of such a spread tube camera in underwater applications has been considered by those skilled in the art to be impractical, if not impossible.

An additional problem experienced in prior art systems has been a significant reduction in picture quality which is experienced due to changes in functioning of electronic camera components in response to environmental changes such as temperature drops occurring on introduction of the camera into frigid waters.

Prior art underwater camera systems have been limited in the number of camera functions which could be remotely controlled. Thus, when electronic component performance changed during camera operation, the camera had to be brought to the surface, removed from its housing, and manually adjusted and tuned for proper function in its surrounding environment. Often, several repetitions of this procedure have been necessary to obtain proper adjustment in those conditions. Even then, if conditions change further, the procedure may have to be necessarily repeated again. This requirement of repeated surface adjustment of the camera components is very time consuming and clearly is an undesirable limitation which has continually presented problems and inconveniences in the prior art underwater camera systems.

In addition to considerations of camera size, shape and picture quality, another important aspect of deep water exploration is the ability to quickly analyze the pictures received and obtain data which is useful in identifying the particular structure or material being viewed. Prior applications have required constant visual monitoring by users, with a separate analysis of the results obtained. Furthermore, if the user was in fact a diver operating a camera, he did not have access to appropriate analytic tools while using the camera underwater.

Although prior art television cameras have been attached to monitoring equipment on the surface vessel, it has not been possible to accurately pinpoint the underwater location of the remotely operated camera other than by visually identifying surrounding geographic configurations. Thus, after identifying a particular structure which is of interest, it has been necessary to visually monitor the camera's view field and return the remotely controlled camera to the desired location by identification of the camera's surroundings. This procedure is cumbersome, time consuming, and expensive.

In light of the above considerations, it would be a great improvement in the art, as well as a solution to several longstanding problems in the art, to provide a color television camera which could produce high quality color resolution and picture quality when utilized in high pressure, or dense shielding, underwater applications. A further improvement in the art would be to provide such a camera which would permit quick and easy access for maintenance, and which could be removed from the canister housing in component parts so as to permit replacement of malfunctioning sections, thereby allowing for continued camera use during repair of the malfunctioning portions. Another improvement would be to provide an underwater camera whose components could be remotely adjusted and tuned so as to overcome adverse effects resulting from changes in the camera environment. A further improvement would be to provide an underwater color television camera which is interfaced directly with a computer for providing computer graphics capabilities and for permitting immediate surface use or underwater diver analysis of exploration findings, as well as for control of camera operation and navigation. A further important improvement in the art would be to provide computer character production capability for permitting visual communication of information from a surface vessel to a diver manually operating the camera in a water environment, thus providing analytic tools for use by the underwater diver.

SUMMARY AND OBJECTS OF THE PRESENT INVENTION

An underwater color television camera comprised of a spread tube, three-color camera construction encased within a housing which permits camera operation at depths of over 2,500 feet. Mounted in the housing are temperature and depth sensors; means are provided for connection of other associated monitoring equipment. Means are also provided in both the viewfinder and the camera housing for permitting the evacuation of air and moisture and the introduction of inert or other gases therein. The housing comprises three interconnected sections, each containing discrete camera parts so that one section and its associated camera parts may be replaced with an identical section in order to permit repair or other work on the original section, thereby providing for continued use of the camera system. A remotely controllable rotating filter element is positioned within the camera.

The housing and camera are connected to the surface control unit by means of a support cable and a coaxial or triaxial cable which permits remote control of many camera functions including filter rotation, fine tuning, and operation of interconnected equipment. The surface control unit includes a computer system which has, among other things, graphics capabilities and position identification and navigation ability. The computer system interfaces with a surface display and with the camera mounted viewfinder display. This permits visual superposition onto the viewing screen of graphic or other information stored within the computer, along with the television picture. The computer may also control camera operation as well as operation of any interconnected equipment.

It is, therefore, one important object of the present invention to provide an underwater color television camera for use in high pressure or dense shielding applications which provides a high quality picture having very good color resolution.

Another important object of the present invention is to provide an underwater camera system which includes a spread tube color television camera and a high quality lens used in conjunction therewith.

A further important object of the present invention is to provide an underwater camera which is comprised of several interconnected, discrete sections, each being separable from the remainder of the camera and replaceable so that camera use may continue during servicing of the specified camera section.

A further object of the present invention is to provide a remotely controlled underwater television camera which includes means for remotely controlling the standard fine tuning features of the television camera.

Still another important object of the present invention is to provide a remotely controlled underwater camera which includes an interface to a computer system so as to provide computer graphics capabilities, with the graphics being displayable, in combination with the picture transmitted from the camera, on surface video monitors and on the camera viewfinder.

Yet another important object of the present invention is to provide an underwater camera which is remotely controllable by a computer system, both as to the operation of its camera functions and the determination of the location of the underwater camera at any given time.

These and other objects and features of the present invention will become more fully apparent from the following description and appended claims taken in conjunction with the accompanying drawings.

DETAILED DESCRIPTION OF THE PREFERRED EMBODIMENTS

Figure 1:
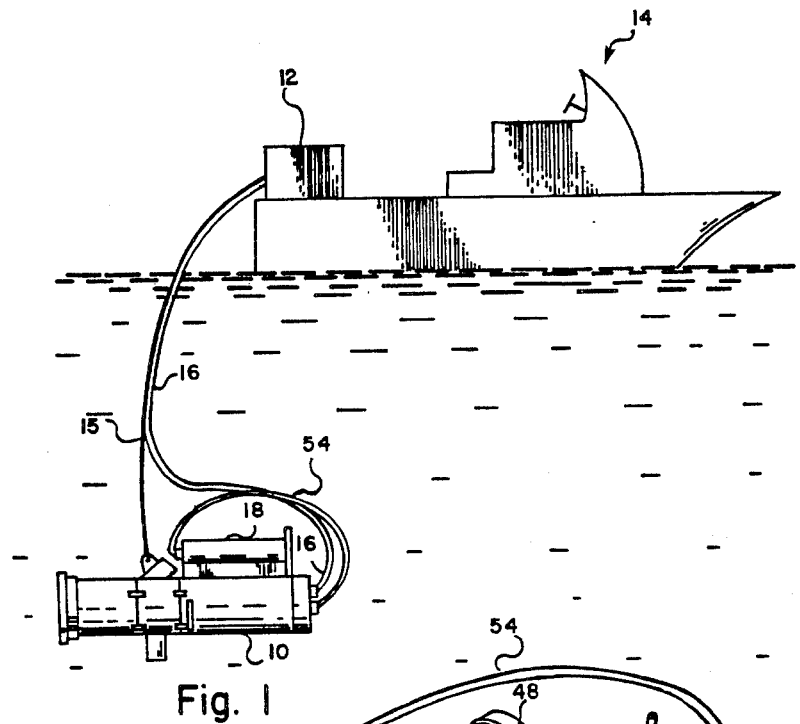
FIG. 1 is a schematic illustration showing the underwater camera system of the present invention, including the system control units positioned on a surface vessel.

The invention is best understood by reference to the figures wherein like parts are designated with like numerals throughout.

The underwater camera of the present invention may be used in a variety of underwater exploration circumstances. For purposes of illustration, the underwater camera generally designated 10 has been shown in FIG. 1 in conjunction with an electronic control system 12 positioned in a surface vessel generally designated 14. Control system 12 is connected to underwater camera 10 by means of a support cable 15 and a coaxial or triaxial cable 16 which is capable of transmitting and receiving signals on a multiplicity of discreet frequency levels between control system 12 and camera 10.

When the underwater camera system of the present invention is configured as illustrated in FIG. 1, it becomes apparent that camera 10 may be operated remotely by an operator positioned upon vessel 14 through use of electronic control system 12. Communication between the camera 10 and the electronic control system 12 is maintained by the transmission of signals through coaxial cable 16. Mobility of the underwater camera 10 during remote operation is achieved either with the use of divers in more shallow applications, or by securing the camera to a propelling means (not shown) of the type generally known in the industry. Alternatively, the position of camera 10 may be changed by changing the location of surface vessel 14.

Figure 2:
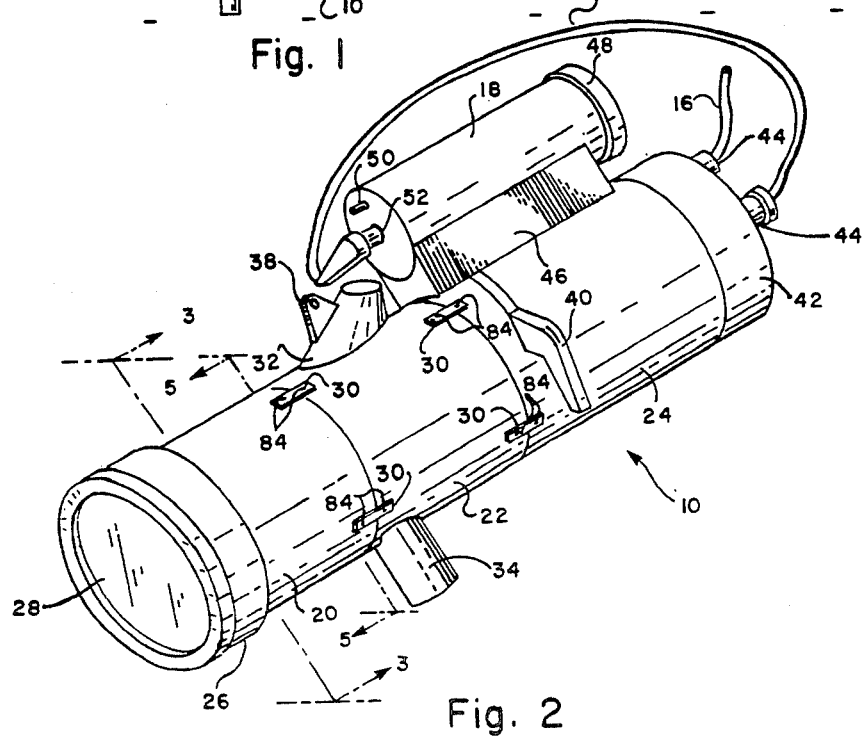
FIG. 2 is a perspective view of one embodiment of the underwater camera of the present invention.

As best illustrated in FIG. 2, the housing of underwater camera 10 comprises a generally cylindrically elongated member constructed of structurally sound materials such as aluminum or steel which are capable of withstanding external pressures such as those present in water at depths exceeding 2500 feet below the water surface. The housing itself is preferably divided into three distinct sections consisting of a lens section 20, a tube section 22, and an electronics section 24.

Sections 20, 22, and 24 of underwater camera 10 are fastened together by means of connecting tabs 30. Tabs 30 are preferably comprised of metallic connecting members positioned on indentations on the surface of underwater camera 10 so as to extend on either side of adjacent section edges. Tabs 30 are secured by screw connection 84 to the body of underwater camera 10. In order to insure a water-tight seal between the sections of underwater camera 10, an O-ring seal (not shown) is positioned along the entire surface between adjacent section edges.

Through use of tabs 30, the three segments of camera 10 may be securely fastened so as to protect the camera in the high pressure underwater environment. In addition, this uncomplicated securing means also permits the quick and easy assembly or disassembly of camera 10 so as to provide for more efficient maintenance and repair of the camera.

As will be appreciated, the housing of the preferred embodiment described herein is uniquely constructed so as to securely house a three-tube color camera and a high quality lens system, and to provide waterproof, secure protection for these devices at pressures in excess of 1100 pounds per square inch, which is equivalent to the pressures experienced at depths exceeding 2500 feet below the water surface. Of course, depending upon such things as the types of materials from which the housing is constructed, the camera 10 may be designed for use at a maximum pressure of much less or much greater than 1100 pounds per square inch. The housing additionally is constructed so as to permit easy access to and removal of malfunctioning camera parts.

Lens section 20 includes a lens cover 26 which is threadably attached so as to surmount to the forward end of the lens section. As explained more fully hereafter, lens cover 26 secures a pressure-taking lens 28 to the forward end of lens section 20. Pressure-taking lens 28 is comprised of a substantially circular plate constructed of glass, transparent plastic, or similar materials capable of withstanding high pressure while permitting maximum through passage of light.

Extending outward from the surface of tube section 22 are two protrusions which comprise a blue tube cover 32, and a red tube cover 34. These tube covers comprise hollow extensions of the housing of camera 10 and are oriented so as to cover and securely protect color tubes extending outward from the body of a television camera contained within the housing. Affixed to the upper face of blue tube cover 32 is an anchor flange 38 which includes an aperture through which support cable 15 may be securely anchored to support the underwater camera 10 and connect the camera to surface vessel 14.

Affixed to the exterior surface of two sides of the electronics section 24, and extending outwardly and generally downwardly therefrom, are handles 40 which provide means for manual camera operation by underwater divers.

Rear cover plate 42 is securely affixed to the rear end of electronics section 24. Extending within the body of rear cover plate 42 are several cable connectors 44 which provide for interconnection of underwater camera 10 with other control, communication, or monitoring devices.

An elongated base 46 is positioned along the top surface of electronics section 44 and in axial alignment with blue tube cover 32. Upon base 46 is securely fastened the lower surface of viewfinder housing 18. Viewfinder housing 18 comprises an elongated cylindrical member which contains a viewfinder of the type commonly used with color television cameras. A viewfinder lens cover 48 is threadably secured to the rearward end of viewfinder housing 18 so as to provide waterproof protection for the contents of housing 18.

Positioned on the forward end of viewfinder housing 18 and extending to the interior of that housing is a pressure valve 50 which permits varying of the air pressure within viewfinder 18. Pressure valve 50 may additionally be used for evacuating the gas from viewfinder 18 and replacing it with a desired gas, such as an inert gas. A cable connector 52 is also connected in the forward end of view finder housing 18 so as to provide an electrical connection between the electrical equipment within viewfinder 18 and the underwater camera 10. Viewfinder 18 is connected to underwater camera 10 by means of a multi conductor cable 54 which transmits signals between cable connector 52 and the appropriate cable connector 44. Typically, cable 54 contains one or more coaxial conductors, and the necessary non-shielded wires to carry control voltages from camera 10 to viewfinder 18.

Figure 3:
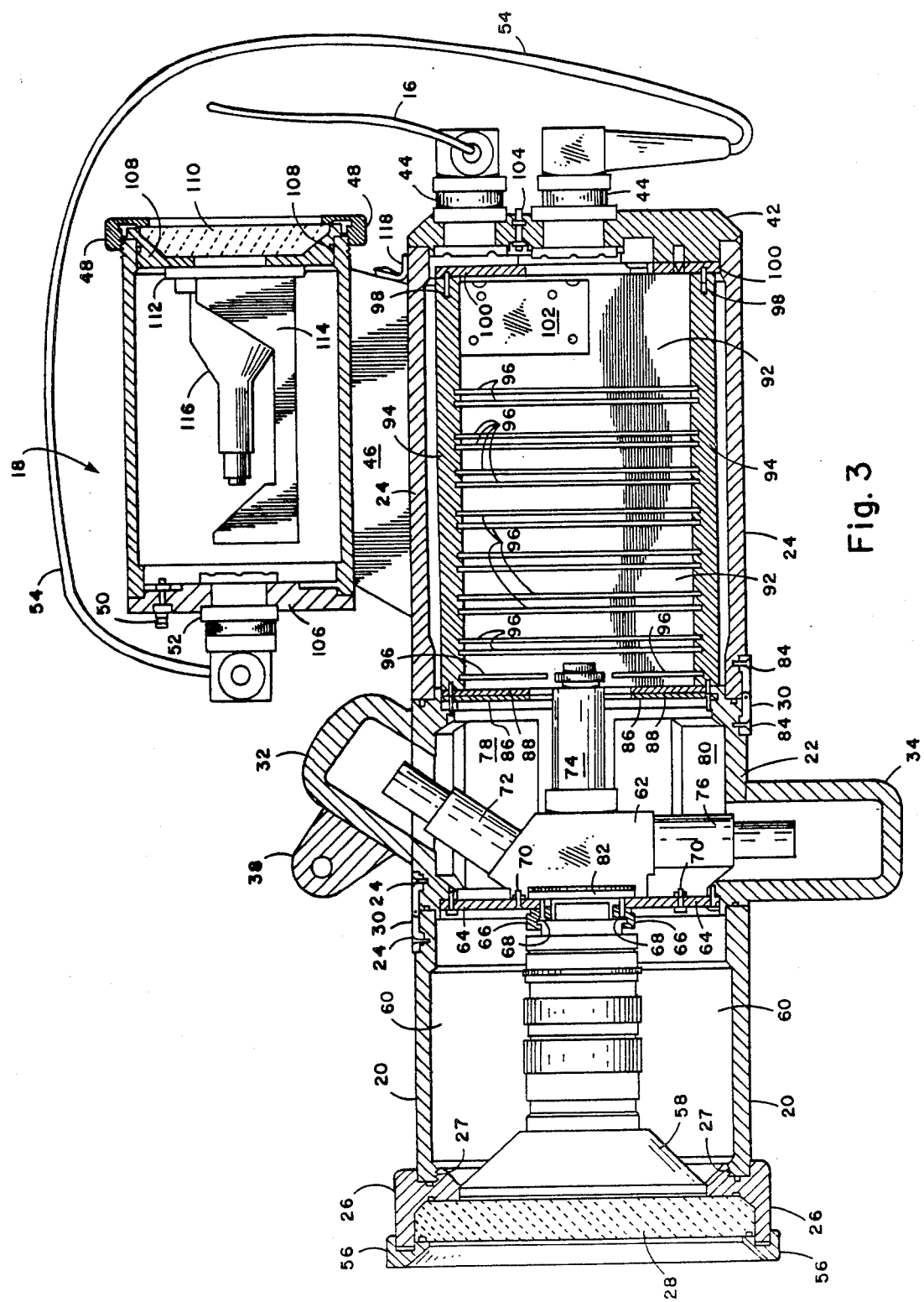
FIG. 3 is a cross section of the underwater camera of FIG. 2 taken along lines 3—3.

The interior configuration of underwater camera 10 can best be described by reference to FIG. 3. Upon examination of lens section 20, it becomes apparent that lens cover 26 comprises a circular support ring having a threaded slot 27 on its rearward side which is threadably connected to the threaded forward end of lens section 20. The forward inner portion of lens cover 26 conformably receives the rearward outer surface periphery and the ends of the pressure-taking lens 28. A retaining ring 56 is secured by tongue-in-groove connection about the entire outer end of lens cover 26. Retaining ring 56 comprises an O-shaped member having its inward side tapered outward from rear to front, thereby increasing the field of view available to a camera lens. The inner rear surface of retaining ring 56 is in contact with the forward outer surface of pressure-taking lens 28 about its entire periphery, so that pressure-taking lens 28 is in water-tight contact with lens cover 26.

The rear surface of pressure-taking lens 28 is positioned directly adjacent the forward surface of a high quality picture taking lens 58. Electronic circuit boards 60 used in controlling camera functions such as iris adjustment within lens 58, are also positioned on the interior of lens section 20. Picture taking lens 58 is preferably comprised of a high quality color television camera lens having a focal length which extends from less than an inch to infinity without adjustment of the lens or any associated equipment. Such lenses are well-known in the television camera industry and are available in the commercial marketplace. Through use of such a lens, high quality pictures of essentially any underwater subject, moving or fixed, may be obtained without the need for focusing.

Picture-taking lens 58 is retained in axial alignment with the light entrance to optical prism assembly 62 by connection of the rear end of lens 58 to a prism support plate 64. Prism support plate 64 is a circular plate of metallic construction and is in contact about its outer periphery with the interior of tube section 22. The prism support plate is retained in this position by a screw connection between the outer portion of the plate and an inward-directed notch on the interior surface of tube section 22. An aperture is defined in the center portion of prism support plate 64 so as to permit the passage of light between lens 58 and optical prism assembly 62.

Prism support plate 64 is connected to picturetaking lens 58 by a bayonet retaining system comprising one or more slotted securing members 66 which are attached to the forward side of plate 64 about its central apperture. One or more tabs 68 on the rear end of lens 58 are sized so as to conform to the slot of securing members 66. By positioning the ends of tabs 68 adjacent to the ends of the slots in members 66 and by rotating lens 58, the tabs 68 are conformably connected to and secured in the slots of members 66.

Optical prism assembly 62 is secured so that its light entrance is adjacent to and in axial alignment with lens 58 by connecting the forward face of assembly 62 to the rear face of prism support plate 64 by screw connections 70.

Blue color tube 72 extends outwardly and upwardly at an angle of approximately 45° with respect to the vertical axis of optical prism assembly 62. Green color tube 74 extends directly outward from the rear of optical prism assembly 62 so as to be in axial alignment with lens 58. Red color tube 76 extends directly downward from a connection with optical prism assembly 62. Each of color tubes 72, 74 and 76 are connected to optical prism assembly 62 in an orientation that maximizes receipt of light of the appropriate color from a prism contained within optical prism assembly 62. Tube section 22 also contains electronic circuit boards 78 and 80, which control the camera filter operation and camera color resolution.

Filter 82 is positioned between the rear of lens 58 and the light entrance of optical prism assembly 62. Filter 82, which enhances the camera's ability to provide quality pictures, is adjustable to any one of several various filter settings depending upon the environmental surroundings of the camera or of the subject being photographed.

A support plate 86 is affixed by screw means to the inner surface of tube section 22. Either the male or female portion of a typical 50-pin electrical connector is secured to the rear face of support plate 86. Electronic circuit boards 78 and 80 are connected electrically to the 50-pin electrical connector on support plate 86, such that power and electronic signals may be received therethrough.

A second support plate 88 is attached by screw means to the forward interior portion of electronics section 24. The mating portion of the 50-pin electrical connector is secured to the forward face of support plate 88. When electronic section 24 is connected to tube section 22, mating contact is established between the electrical connectors on adjacent faces of support plates 86 and 88, thereby enabling transmission of electrical signals from electronics section 24 to the remainder of the camera.

Board supporting members 94 consist of two nonconductive plates, positioned in parallel alignment on opposing interior sides of electronics section 24. Board supporting members 94 provide a plurality of parallel slots which are in corresponding alignment between the parallel plates on their interior surfaces.

A plurality of electronic circuit boards 96 extend in parallel alignment between corresponding slots in members 94. Circuit boards 96 are positioned within the slots so as to be in contact along one end with a "mother board" 92. Mother board 92 extends substantially the full length of electronics section 24 with its top and bottom edges each adjacent to separate board supporting members 94. Electrically conductive paths are deposited on the surface of mother board 92 so as to permit proper electrical connection between circuit boards 96. By this arrangement, the electronic circuitry contained in each circuit board 94 is provided with the electrical connections necessary for its functioning and communication with the circuits of the other boards.

The rear ends of supporting members 94 are connected by screw means 98 to conducting plates 100 which are themselves affixed to the rear cover plate 42 of the camera. Conducting plates 100 are additionally connected through conventional electronic means to connectors 44, thereby permitting the transmission of electronic signals between the camera and external electronic equipment.

A power supply 102 is positioned adjacent to the rear and outer edges of the interior of electronic section 24. During normal operation of a suitable television camera, the typical power requirements generate a significant amount of heat which must be dissipated. In the closed interior of electronics section 24, there is no air circulation to carry away the heat, but by positioning supply 102 near the exterior surfaces of the camera, the excess heat is transferred through the housing to the cold waters outside of the camera.

Television picture signals, as well as other signals, are transmitted from underwater camera 10 to viewfinder 18 by passing them through one of the connectors 44 on the rear of underwater camera 10, through coaxial cable 54, and into connector 52 on the forward end of viewfinder 18. In addition to the coaxial lines within cable 54, three electrical wires are also included for transmitting power from power source 102 to viewfinder housing 18.

Also extending through rear cover plate 42 of underwater camera 10, is a gas transfer valve 104 similar to valve 50 in viewfinder 18. As was previously indicated, by interconnecting either of these valves to a pump means, gases within the connected interior may be evacuated and replaced by other gases. It is often desirable to utilize inert gases in the underwater camera in order to prevent arcing, corrosion, or other possible malfunctions which may occur in the electronic equipment contained within the camera 10 or viewfinder 18 in the presence of moist air. Additionally, the gas pressure within viewfinder housing 18 or the housing of camera 10 may be regulated through valves 50 and 104 so as to provide the optimum operating environment for the electronic and camera equipment contained therein. By providing this ability to regulate the operating environment of the electronic and camera equipment, the present invention avoids many of the malfunctions which create time delays and expensive repair costs in prior art systems which do not include this feature.

A lens support member 108 is positioned between the front of viewfinder housing 18 and lens cover 48. Lens support member 108 is comprised of a circular metallic block having an aperture at its center of sufficient size to accomodate a cathode ray tube ("CRT") screen of a typical underwater viewfinder. The outer edges of support member 18 extend over the rear end of viewfinder housing 18 so as to be sandwiched between that end and the rear surface of lens cover 48.

Pressure-taking lens 110 is positioned upon the outer surface of lens support member 108, and in conformity with those outer edges. Pressure-taking lens 110 is secured in place by contact at its outer surface periphery with the interior face of lens cover 48. As lens cover 48 is threadably tightened into place, lens support member 108 and pressure taking lens 110 are fixed into position so as to prevent movement, and to additionally prevent water leakage into the interior of viewfinder housing 18.

CRT support member 112 is positioned on the inside surface of lens support member 108 and extends across the aperture within member 108. Support member 112 is positioned such that an electronic chassis 114 may be secured along its outer edges against member 112 in a tongue-in-groove relationship. A CRT 116 is supported on electronic chassis 114 in a manner which is well-known in the television industry, so as to position the forward screen of CRT 116 adjacent to the inner surface of glass 110 and in axial alignment with the center of the aperture in support member 108.

The base 46 of viewfinder 18 may be removably secured to the surface of electronics section 24 by use of one or more screw and bracket arrangements as illustrated at 118. By removably mounting viewfinder 18 to electronics section 24, a replacement viewfinder may be installed during repair of viewfinder 18, thus permitting continued use of camera 10 without a substantial delay or interruption in the filming process.

With the underwater camera configurated as described above, a diver operating the camera may easily monitor the camera's field of view by reference to the viewfinder which is positioned directly in front of the diver's face. In addition, because the camera housing and its contents are segregated into three separate detachable sections, access to malfunctioning camera parts is greatly enhanced over the prior art stacked tube cameras, thereby allowing for much faster camera maintenance and repair. Also, since the various camera and housing segments are completely detachable from each other, segments containing malfunctioning components may be quickly replaced by properly functioning segments.

Figure 4:
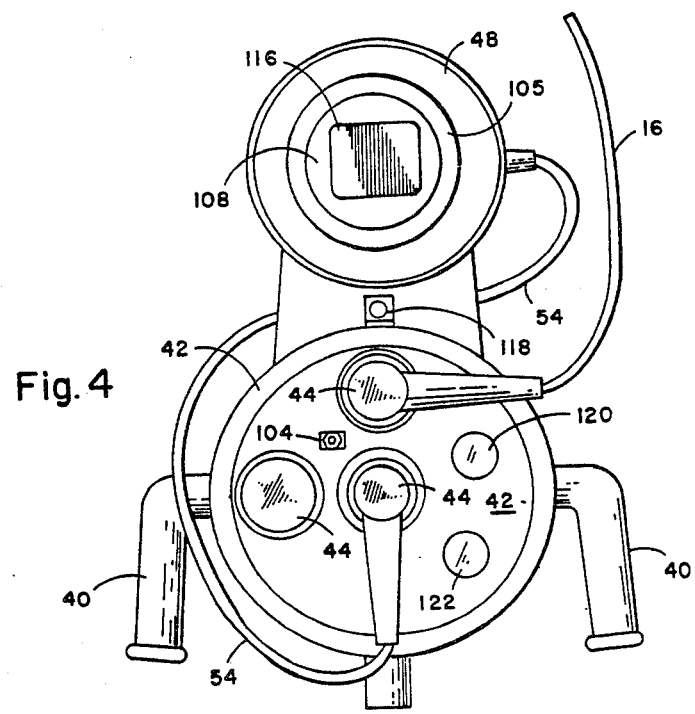
FIG. 4 is a rear plan view of one embodiment of the underwater camera of the present invention.

By reference to FIG. 4, it is possible to further understand the exterior appearance of several of the features located at the rear portion of the underwater camera and viewfinder 18. Temperature sensor 120 and depth sensor 122 are threadably attached within the rear outer portion of the surface of cover plate 42. These devices may be used for assistance in identifying the underwater location of the camera, or they may be used to provide important correlary information when the camera is used for scientific investigations. Of course, sensors 120 and 122 may comprise any device which may be remotely monitored and is useable in underwater applications for such things as sampling water salinity, or measuring concentrations of chemicals.

In one preferred embodiment, sensors 120 and 122 comprise devices for producing electronic signals corresponding to the water temperature surrounding underwater camera 10 and to the depth of the camera. These signals are transmitted by electrical connection through cover plate 42, connectors 44 and cable 16 to the computer terminal. By this means, camera users may more readily identify the location of the underwater camera. This can be particularly important if it is necessary to return to substantially the same spot for subsequent filming or if the filming is interrupted by mechanical or environmental problems. The ability to quickly identify the location of camera 10 in the underwater environment and to navigate it to desired locations in that environment greatly enhances the economics and efficiency of using such a device in underwater applications.

Figure 5:
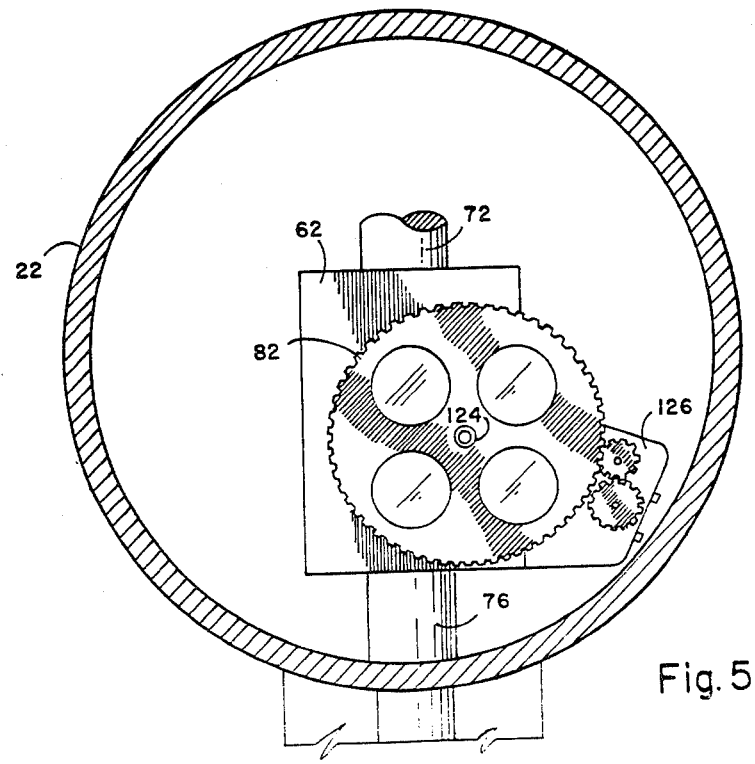
FIG. 5 is a cross section of the underwater camera of FIG. 2 taken along lines 5—5.

The underwater camera 10 also includes a remotely operable rotating filter 82. Filter 82 preferably includes at least four separate filter media which may be positioned in front of the camera lens so as to enhance or otherwise affect the picture transmitted from the camera 10. Filters have been commonly used in prior art camera systems; however these filters have not been remotely adjustable in the camera 10. Thus, as the lighting or coloring on underwater subjects changes, the camera has had to be retrieved to the surface and removed from its housing so that filters could be changed. This was a very cumbersome and often disabling problem. In the present invention, as underwater lighting or other conditions change so as to require use of another filter, that filter may be properly positioned by remotely rotating the filter 82 without necessity of either retrieving the camera or opening its housing to accomplish this. The functioning of filter 82 may best be explained by reference to FIG. 5, which illustrates a front view of the filter as seen after removal of lens section 20 and prism support plate 64. Filter 82 is comprised of a wheel having plural appertures positioned about a central axis. Various filter materials may be placed within the appertures, so as to enhance or otherwise affect light coming from the lens 58 into the optical prism assembly 62.

Filter 82 is positioned at its central axis upon an axle 124 so as to be rotatably fixed to the forward, light receiving portion of optical prism assembly 62. Axle 124 is preferably offset with respect to the center axis of lens 58, and the aligned optical prism assembly 62. By this offset arrangement, the various filter elements in the apertures of filter 82 may be rotated so as to be positioned in direct alignment with both the longitudinal axis of lens 58 and the light input aperture of the optical prism assembly 62.

The rotational position of filter 82 is determined by filter gear assembly 126. Gear assembly 126 comprises a plurality of toothed-wheel gears connected to a driving motor (not shown) in the base of the assembly. The assembly itself is preferably mounted to the lower side of optical prism assembly 62 so that the threaded gear edges are in conformable alignment with the threaded outer edge of filter 82. The operation of filter gear assembly 126 is controlled by signals from electronic circuit boards 78 and 80 which are connected thereto.

One of the unique features of the present invention is the use of the underwater camera in combination with electronic control systems positioned in a surface vessel. Prior art underwater camera systems have generally utilized remote control cables containing discreet conductors. Thus, each camera function required the connection of a separate electrical or mechanical conductor between the surface vessel and the underwater camera. The ability to control many camera functions was thus limited by the physical size and weight of the cable to be used. Certainly in deepwater applications which approach 2500 feet below water surface, cables having many individual electrical wires have proved to be simply too heavy and large to be practical for such use. Hence, the industry has heretofore had to limit the number of camera functions which could be remotely controlled. Because of this limitation, it has not been practical to utilize the capabilities of a computer in the remote control of such a limited number of camera functions.

By use of coaxial or triaxial cables in conjunction with the present underwater camera, upwards of 32 separate signal channels are available. Thus, by transmitting signals through the relatively small and lightweight cable, at least 32 separate camera functions may be remotely controlled. With this many channels available, the underwater camera system becomes particularly compatible for use with computer controlled features such as navigational, communication, and graphic systems. The ability to remotely control so many camera functions not only increases the types of applications in which the camera system may be used, it also avoids the need to retrieve the camera from the underwater environment in order to make those camera adjustments necessitated by changes in the environmental conditions surrounding the camera.

By coupling the underwater camera of the present invention to a computer control and monitoring system based on a surface vessel, graphics may be displayed on the viewfinder of the camera so as to immediately enable a diver to analyze that which he is viewing. Such graphics capability is particularly important in scientific exploration involving identification of peculiar geographic or physical structures. Likewise, computer graphics may also be superimposed upon the television picture being on the surface monitor.

Moreover, the use of elementary computer graphics allows for the transmission of written communications from the surface vessel to diver via the camera viewfinder. A computer navigational package would allow the computer system to monitor the camera depth, water temperature, and other similar parameters, through sensors such as 120 and 122, in order to identify the underwater position of the camera.

Figure 6:
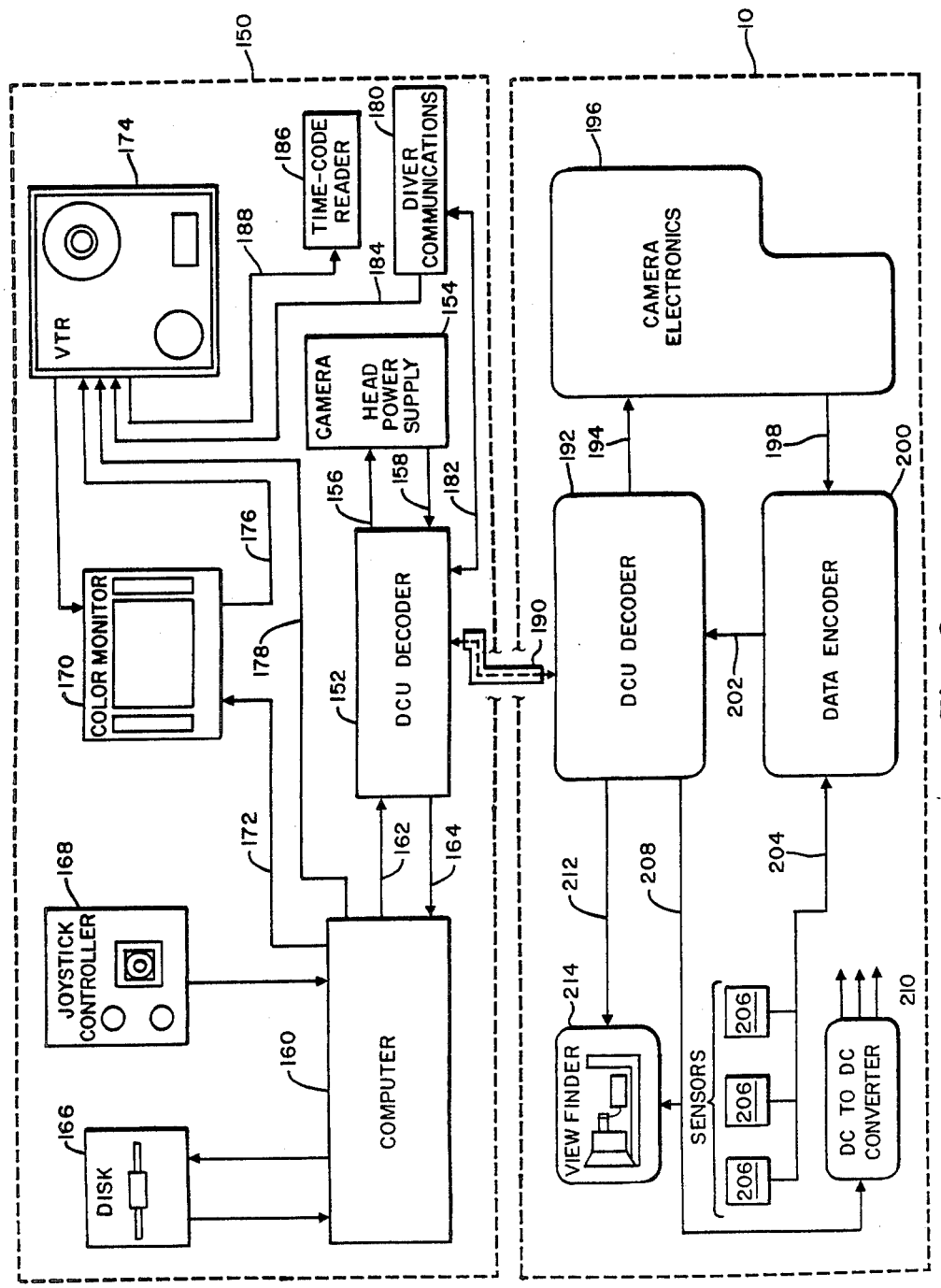
FIG. 6 is a schematic block diagram illustrating one embodiment of the underwater camera system of the present invention including its associated electronics and circuitry.

These and many other useful and important features are available in conjunction with an underwater camera system and computer link-up as described herein. One preferred embodiment for accomplishing such a camera/computer link-up is best shown by reference to FIG. 6.

The underwater camera 10 may be operated remotely by either manual or computer control of the surface vessel control system 150. This operation is accomplished by use of DCU (Digital Command Unit) decoder 152. All controls and switches necessary to operate the camera from the surface are contained within decoder 152, such that one may manually produce control signals for improving color quality, adjusting various camera operating devices, and similar actions. In addition, decoder 152 contains the electronics necessary for encoding and decoding multiplexed signals transmitted to or received from the underwater camera 10.

DC power for operating the underwater camera 10 is transmitted from camera head power supply 154 through line 158 and decoder 152 to the camera. To operate power supply 154, decoder 152 transmits on/off signals across line 156. Graphics capability, navigation capability, data handling and storage, and other features may be incorporated into the system through use of a conventional digital computer 160. Computer 160 is used to monitor and control (through signals transmitted across control line 162) the operation of individual camera features such as color fine tuning, filter rotation, light contrast, brightness, etc. Computer 160 receives both data and video signals from underwater camera 10 through decoder 152 by means of line 164.

A typical device used by computer 160 in data handling and in recording and storing information is disc 166. There are many commercially available disc systems capable of peripheral use with computer systems which can be utilized as disc 166.

A joystick controller 168 may also be connected to computer 160 in order to control pointers which are generated by the computer and superimposed over a video picture on a display. By use of the joystick controller 168, a user may visually point to particular items on the television picture appearing on the viewfinder of the underwater camera.

An operator located on the surface vessel may view the picture which is being recorded by underwater camera 10 through means of a color television monitor 170. Monitor 170 is connected by means of line 172 to computer 160.

Video signals from underwater camera 10 may additionally be transmitted through computer 160 directly to a video tape recorder 174 for recording purposes. The video signal to be recorded may be transmitted through line 176 from color monitor 170. Line 178 carries a serialized data stream at frequencies not to exceed 10 khz for recording on one of the three audio channels made available by recorder 174. This data stream represents sensor and camera set-up information in a coded form. It may be decoded and read off the tape on recorder 174 during playback, and it can be displayed in character form over the picture on the color monitor 170. Audio signals may also be transmitted from computer 160 to recorder 174 for recording purposes.

A direct communications link from the diver may be provided through diver communications device 180, which is connected through line 182 to decoder 152. Diver communications device 180 may interface signals received from the diver's intercom with the video tape recorder 174 via line 184. Thus, diver communications may or may not (whichever is desired) be recorded along with video and audio signals received from underwater camera 10.

By means of a time-code reader 186, signals recorded on videotape recorder 174 may be fixed for subsequent use. Reader 186 is connected to recorder 174 by means of line 188. This reader is particularly important in identifying the actual time at which the signal was recorded.

The surface vessel control system 150 is electrically connected to the underwater camera 10 by means of a triaxial cable 190. A coaxial cable could also be utilized for this purpose. Cable 190 comprises a double shielded, three conductor cable which provides 32 distinct channels upon which control signals, communication signals, data signals and other information may be transmitted during system operation.

Cable 190 is connected within underwater camera 10 to a DCU decoder 192, which includes electronics necessary to encode and decode multiplexed signals transmitted or received through triaxial cable 190. Typical information transmitted from decoder 192 would include camera video information, sensor data, camera status data, and communications from the diver. Typical things which would be received by DCU decoder 192 would include camera power from power supply 154, camera operation control commands from decoder 152 or computer 160, and video picture signals transmitted to the diver's viewfinder from computer 160, with additional computer generated information superimposed thereon.

Through line 194, decoder 192 is connected to camera electronics 196 which comprise the electronics and controls necessary for creating an encoded video signal corresponding to the optical image sensed by the camera lens 58.

Camera electronics 196 is connected by line 198 to data encoder 200, which processes information received from sensors and camera status lines and encodes them along with signals from camera electronics 196 prior to transmission by line 202 to decoder 192.

Data encoder 200 is additionally connected through line 204 to sensors 206 in order to receive data from the sensors. As discussed above, the sensors may be comprised of devices for sensing water depth, water temperature, camera over-temperature, water in the camera housing, or any other desired perameter which is measurable by sensors attached to the camera.

DCU decoder 192 is also connected through line 208 to DC to DC converter 210. Converter 210 receives voltage from cable 190 through decoder 192 and regulates it into the various voltage levels required by the electronic devices contained within the underwater camera. Thus, converter 210 comprises a low voltage power supply for the various electronic elements within camera 10.

Viewfinder 214 is also connected to DCU decoder 192 through line 212. As previously described, the viewfinder comprises a television monitor mounted on underwater camera 10 to provide the diver with an exact view of what the camera is seeing. Thus, video information from camera electronics 196 is transmitted through data encoder 200, and decoder 192 to view finder 214, where it is displayed on the viewfinder screen. In addition, computer generated graphics and characters may be transmitted from computer 160 through decoder 152, cable 190 and decoder 192 to view finder 214 so as to provide communication and visual information from the surface vessel control system 150.

Particular electronic circuits for accomplishing the various functions described above are well-known to those skilled in the art, and are generally available in the commercial marketplace. However, their unique use in combination for creating an underwater color television camera system as described above comprises a very novel solution to what has been an extremely longstanding problem in the art. Thus, the invention described and claimed herein constitutes a long and very important stride forward in the advancement of underwater exploration in high pressure or dense shielding applications.

The underwater camera and associated systems embodied in the present invention offer the following advantages, among others: (1) The unique design of the camera housing permits use of spread tube color television cameras and high quality lenses for production of high quality color television pictures having very good color resolution in high pressure or dense shielding applications. (2) By segregating the camera housing and its contents into three detachable sections, the ability to access malfunctioning camera parts is greatly enhanced, thus providing faster completion of camera maintenance. (3) Because the camera housing and enclosed camera systems are constructed in three separate segments, those segments containing malfunctioning parts may be quickly interchanged with properly functioning segments so as to permit continued camera operation during repair of the malfunctioning camera parts. (4) The three-segment design of the camera and housing is arranged such that the camera may be quickly assembled, or disassembled. (5) The use of triaxial or coaxial cable in conjunction with underwater camera operation permits remote control of numerous camera functions, and thus avoids any need for manual camera adjustments in response to changes in environmental conditions. (6) By combining the underwater camera system with computer devices, many computer-oriented capabilities are available to enhance the economics of high pressure exploration and to multiply the possible areas of application for underwater television cameras in exploration. (7) By providing a means for modifying the gas composition and pressure within the camera housing, camera operating conditions within that housing may be optimized.

The invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. An underwater camera comprising:
   a television camera which is divisable into plural portions;
   a housing configured so as to encase the television camera in close proximity to interior housing walls and to provide waterproof protection in underwater environments;
   a plurality of sections in the housing which are removably connected together and which are arranged so that each housing section is associated with at least one of the portions of the camera so as to provide access to components within said camera;
   a substantially transparent member positioned in the housing so as to permit passage of light from exterior camera surroundings to the television camera within said housing;
   a high quality camera lens disposed within the housing and connected to the television camera, said lens having a substantially infinite focal range so as to require substantially no adjustment of said focus while said television camera is in use;
   means positioned in the housing for electrically connecting the television camera to an external device;
   means contained within the housing and contacting the television camera for supporting and stabilizing said camera within said housing; and
   means electrically connected to the television camera for monitoring television pictures produced by said camera.

2. An underwater camera as defined in claim 1 further comprising means for transmitting and receiving a plurality of signals of different frequencies along a cable between the camera and the external device.

3. An underwater camera as defined in claim 2 wherein the external device includes a computer system having means for communicating with said camera and controlling operation thereof and having means for processing information received from said camera.

4. An underwater camera as defined in claim 1 wherein the housing is configured to provide waterproof protection for its contents at external pressures up to and exceeding 1100 pounds per square inch.

5. An underwater camera as defined in claim 1 wherein any housing section and its associated camera portion may be easily removed from the underwater camera system and replaced by other housing sections and camera portions.

6. A remotely controllable underwater camera system comprising:
   a spread-tube color television camera which is divisable into plural portions;
   a high quality picture-taking lens connected to said camera;
   a housing which encases said camera and said lens in close proximity to interior housing walls, and provides waterproof protection in underwater environments, said camera, lens and housing defining a plurality of sections which are removably connected together in a configuration such that each of the plural sections of said housing is associated with at least one of the portions of said camera and lens so that any housing section and its associated camera and lens portion may be easily removed from the underwater camera and replaced by similar sections and portions;
   means positioned on the housing for connecting said housing to external support devices;
   means positioned on the exterior surface of the housing so as to connect and securely maintain adjacent sections of said housing in water-tight relationship, said connector means being easily removeable for obtaining access to the contents of said housing sections;
   at least one cavity in the housing, said cavity being positioned so that color tubes of the television camera may extend therein when said television camera is encased in said housing;
   means contained within the housing for supporting and stabilizing the television camera and lens within said housing;
   a transparent plate in the housing, said plate being positioned so as to permit passage of light from the exterior camera surroundings to the television camera within said housing;

means positioned in the housing for electrically connecting the television camera to external devices so as to transmit electrical signals therebetween;

a television view-finder electrically connected to the television camera for displaying said camera's field of view; and means connected to said camera for remotely controlling a plurality of camera functions.

7. An underwater camera system as defined in claim 6 further comprising means for regulating the pressure and composition of gas within the housing.

8. An underwater camera system as defined in claim 6 wherein the high quality picture taking lens comprises a television camera lens which provides a substantially clear view to the television camera of objects at distances from said lens in the range from about one inch to infinity without the requirement of focusing said lens.

9. An underwater camera system as defined in claim 6, further comprising:

means for securing sensing equipment to the housing of the camera, said sensing equipment including means for producing signals representing sensor measurements.

10. An underwater camera system as defined in claim 9 wherein the sensing equipment detects water pressure surrounding the camera.

11. An underwater camera system as defined in claim 9 wherein the sensing equipment detects water temperature surrounding the camera.

12. An underwater camera system as defined in claim 9 further comprising means responsive to signals from the sensing equipment for identifying the approximate underwater location of the camera.

13. An underwater camera system as defined in claim 6 further comprising a filter means positioned between the picture-taking lens and a prism section of the television camera, said filter means being remotely rotatable and having plural filters arranged thereon such that selected filter elements may be positioned to permit passage of light therethrough, from said lens to said prism section.

14. An underwater camera system as defined in claim 6 wherein said remote control means comprises a remote control center electrically connected so as to control a plurality of camera functions through a single cable.

15. An underwater camera system as defined in claim 14 wherein said single cable comprises a multiconductor cable.

16. An underwater camera system as defined in claim 6 wherein the remote control means comprises:

means for encoding and decoding signals transmitted between the camera and the remote control means;

a processing means connected to said encoding and decoding means for processing signals transmitted between the camera and the remote control means;

at least one means for storing signals used by said processing means;

means connected to the processing means for monitoring pictures received from the television camera and for monitoring visual representations of signals transmitted from said remote control means to the camera;

means connected to the processing means and to the encoding and decoding means for storing signals representative of visual and audio information present in said underwater camera system; and a power supply connected to the encoding and decoding means for providing operational power to the underwater camera system.

17. An underwater camera system as defined in claim 6 further comprising:

electronic means positioned within the housing and responsive to the remote control means for controlling camera components and for transmitting signals from said camera components to said remote control means.

18. An underwater camera system as defined in claim 6 wherein the housing is configured to provide waterproof protection for its contents at external pressures up to and exceeding 1100 pounds per square inch.

19. A remotely controllable underwater camera system comprising:

a spread-tube color television camera which is dividable into plural portions;

a high quality picture-taking lens having a focal length ranging between about one inch and infinity;

a housing configured so as to conformably surmount and encase the television camera and the lens and to provide waterproof protection for said camera and said lens at external pressures up to and exceeding 1100 pounds per square inch, said camera, lens and housing defining a plurality of sections which are removeably connected together in a configuration such that each of the sections of said housing is associated with at least one of the portions of said camera and lens and so that any housing section and its associated camera and lens portion may be easily removed from the underwater camera system and replaced by similar sections and portions;

connectors positioned on the exterior surface of the housing so as to connect and securly maintain adjacent sections of said housing in water-tight relationship, said connectors being easily removeable for obtaining access to the contents of said housing sections;

at least one cavity in the housing, said cavity being positioned and configured so that color tubes of the television camera may extend therein when said television camera is encased in said housing;

support members contained within the housing and configured so as to contact and support the camera and lens sections within said housing;

at least one sensor positioned on the housing for monitoring environmental conditions surrounding said housing;

a transparent plate positioned in the housing so as to permit passage of light from the exterior camera surroundings to the television camera within said housing;

pressure regulating devices positioned in the housing for regulating the pressure and composition of gas within said housing;

a remotely rotatable filter positioned between the picture-taking lens and a prism section of the television camera, said filter having plural filter settings arranged thereon such that selected filter elements may be positioned to permit passage of light therethrough from said lens to said prism section;

electrical connectors positioned in the housing for electrically connecting the contents of said housing to external devices so as to transmit electrical signals therebetween;

a television view-finder electrically connected to the television camera for displaying said camera's field of view; and a remote control center electrically connected so as to control a plurality of functions of the television camera through at least one multiconductor cable.

20. An underwater camera system as defined in claim 19 wherein the remote control center comprises:

means for encoding and decoding signals transmitted between the camera and the remote control center;

a processing means connected to said encoding and decoding means for processing signals transmitted between the camera and the remote control center;

at least one means for storing signals used by said processing means;

means connected to the processing means for monitoring pictures received from the television camera and for monitoring visual representations of signals transmitted from said remote control center to the camera;

means connected to the processing means and to the encoding and decoding means for storing signals representative of visual and audio information present in said underwater camera system; and a power supply connected to the encoding and decoding means for providing operational power to the underwater camera system.

21. An underwater camera system as defined in claim 20 further comprising:

electronic circuitry positioned within the housing and responsive to signals from the remote control center for controlling camera components and for transmitting signals from said camera components to said remote control center.

22. A method of visually exploring underwater environs comprising the steps of:

encasing a spread-tube color television camera and camera lens in a housing configured so as to conformably surmount said television camera and lens and to provide waterproof protection for said camera and lens in underwater environments, said camera, lens and housing configured so as to define a plurality of sections which are connected together in a manner such that each of the sections of said housing is associated with one of the sections of said camera and lens and so that any housing section and its associated camera and lens section may be easily removed from connection with the other sections and replaced by a similar housing section and associated camera and lens section;

electrically connecting the television camera and lens to a remote control system through a multiconductor cable so as to permit remote control of selected camera and lens functions;

submerging the housing, camera and lens in water;

remotely controlling operation of the camera and lens by means of the remote control system;

monitoring the picture and sound produced by the camera and lens;

electronically storing data corresponding to the picture and sound produced by the camera and lens;

visually presenting computer generated information at the location of the remote control system in conjunction with the monitoring step; and visually presenting the computer generated information and the monitored picture produced by the camera on a television camera viewfinder which is mounted on the housing.

23. A method as defined in claim 22 further comprising the steps of:

monitoring selected environmental conditions surrounding the camera; and identifying the approximate underwater location of the camera in response to the monitored picture and the monitored environmental conditions.

24. A method as defined in claim 22 wherein said step of remotely controlling operation of the camera and lens includes the step of adjusting and fine-tuning the operation of the camera and lens so as to maximize picture quality produced by said camera and lens during operation under substantially any environmental condition.

25. A method as defined in claim 22 wherein the step of encasing the camera and camera lens includes securing the camera in a housing configured to provide waterproof protection for said camera and camera lens at external pressures up to and exceeding 1100 pounds per square inch.

* * * * *

UNITED STATES PATENT AND TRADEMARK OFFICE
CERTIFICATE OF CORRECTION

PATENT NO. : 4,485,398

DATED : November 27, 1984

INVENTOR(S) : Herbert D. Chapin et al.

It is certified that error appears in the above—identified patent and that said Letters Patent is hereby corrected as shown below:

Column 3, line 10, "accomodate" should be --accommodate--

Column 3, lines 2-3, "accomodate" should be --accommodate--

Column 5, line 67, "discreet" should be --discrete--

Column 6, line 31, "water-tight" should be --watertight--

Column 7, line 37, "view finder" should be --viewfinder--

Column 7, line 41, "multi conductor" should be --multi-conductor--

Column 7, line 64, "water-tight" should be --watertight--

Column 8, line 25, "picturetaking" should be --picture-taking--

Column 8, line 28, "apperture" should be --aperture--

Column 10, line 14, "accomodate" should be --accommodate--

Column 11, line 2, "correlary" should be --corollary--

Column 11, line 47, "appertures" should be --apertures--

Column 11, line 48, "appertures" should be --apertures--

Column 12, line 7, "discreet" should be --discrete--

Column 12, line 59, "link-up" should be --linkup--

Column 12, line 61, "link-up" should be --linkup--

UNITED STATES PATENT AND TRADEMARK OFFICE
CERTIFICATE OF CORRECTION

PATENT NO. : 4,485,398
DATED : November 27, 1984
INVENTOR(S) : Herbert D. Chapin et al.

It is certified that error appears in the above—identified patent and that said Letters Patent is hereby corrected as shown below:

Column 13, line 58, "video tape" should be --videotape--
Column 14, line 38, "perameter" should be --parameter--
Column 14, line 41, "to DC to DC" should be --to DC--
Column 14, lines 54-55, "view finder" should be --viewfinder--
Column 14, line 59, "view finder" should be --viewfinder--
Column 16, line 53, "water-tight" should be --watertight--
Column 16, line 55, "removeable" should be --removable--
Column 17, line 4, "view-finder" should be --viewfinder--
Column 18, lines 17-18, "dividable" should be --divisable--
Column 18, line 29, "removeably" should be --removably--
Column 18, line 37, "securly" should be --securely--
Column 18, line 38, "water-tight" should be --watertight--
Column 19, line 1, "view-finder" should be --viewfinder--
Column 20, line 34, "fine-tuning" should be --fine tuning--

Signed and Sealed this

Eighteenth Day of June 1985

[SEAL]

Attest:

DONALD J. QUIGG

Attesting Officer

Acting Commissioner of Patents and Trademarks